(12) United States Patent
Tisue

(10) Patent No.: US 8,894,141 B2
(45) Date of Patent: Nov. 25, 2014

(54) BICYCLE SEAT CLAMP

(71) Applicant: Kevin Christopher Tisue, Park City, UT (US)

(72) Inventor: Kevin Christopher Tisue, Park City, UT (US)

( * ) Notice: Subject to any disclaimer, the term of this patent is extended or adjusted under 35 U.S.C. 154(b) by 19 days.

(21) Appl. No.: 13/780,996

(22) Filed: Feb. 28, 2013

(65) Prior Publication Data

US 2014/0239682 A1 Aug. 28, 2014

(51) Int. Cl.
*B62J 1/10* (2006.01)
*B62J 1/04* (2006.01)
*B62J 1/08* (2006.01)

(52) U.S. Cl.
CPC .......................... *B62J 1/08* (2013.01)
USPC .................. 297/215.14; 297/215.15; 297/205

(58) Field of Classification Search
CPC .......................................... B62J 1/08
USPC ................ 297/204, 205, 207, 215.14, 215.15
See application file for complete search history.

(56) References Cited

U.S. PATENT DOCUMENTS

| | | | |
|---|---|---|---|
| 4,223,905 A | 9/1980 | Persons, II et al. | |
| 4,421,357 A * | 12/1983 | Shimano .................. | 297/215.14 |
| 4,783,119 A * | 11/1988 | Moses ....................... | 297/215.14 |
| 4,836,604 A * | 6/1989 | Romano .................. | 297/215.14 |
| 4,983,063 A | 1/1991 | Phillips | |
| 5,190,346 A * | 3/1993 | Ringle ...................... | 297/215.14 |
| 5,244,301 A * | 9/1993 | Kurke et al. .......... | 297/215.15 X |
| 5,433,504 A | 7/1995 | Kao | |
| 5,466,042 A * | 11/1995 | Herman .................... | 297/215.15 |
| 5,501,506 A * | 3/1996 | Kao .......................... | 297/215.15 |
| 5,547,155 A | 8/1996 | Herting | |
| 5,649,738 A * | 7/1997 | Thomson et al. ........ | 297/215.15 |
| 5,664,829 A * | 9/1997 | Thomson et al. ........ | 297/215.14 |
| 5,695,241 A * | 12/1997 | Olsen et al. ............. | 297/207 X |
| 5,722,718 A * | 3/1998 | Still et al. ................ | 297/215.15 |
| 5,979,978 A * | 11/1999 | Olsen et al. ............. | 297/215.15 |
| 5,988,741 A * | 11/1999 | Voss et al. ................ | 297/215.15 |
| 6,164,864 A | 12/2000 | Beach et al. | |
| 6,488,334 B1 | 12/2002 | Geyer et al. | |
| 6,499,800 B2 | 12/2002 | Morgan, Jr. | |
| 7,431,391 B2 | 10/2008 | Hsiao | |
| 7,559,603 B1 * | 7/2009 | Chiang .................... | 297/215.14 |
| 7,559,604 B2 * | 7/2009 | Beaulieu .................. | 297/215.15 |
| 7,681,947 B2 | 3/2010 | Ritchey | |
| 7,722,115 B2 * | 5/2010 | Biro ........................ | 297/215.15 |
| 8,007,041 B2 | 8/2011 | Tisue | |
| 8,267,470 B2 * | 9/2012 | Hsu et al. ................ | 297/215.14 |
| 8,640,999 B2 * | 2/2014 | Chen .................... | 297/215.14 X |
| 8,714,640 B2 * | 5/2014 | Ritchey .................... | 297/215.14 |
| 2005/0146173 A1 * | 7/2005 | Saccucci .................. | 297/215.15 |
| 2005/0200170 A1 | 9/2005 | Liao | |
| 2010/0213744 A1 * | 8/2010 | Ritchey .................... | 297/215.14 |

* cited by examiner

*Primary Examiner* — Rodney B White
(74) *Attorney, Agent, or Firm* — Workman Nydegger

(57) ABSTRACT

A bicycle seat clamp assembly includes a body having opposing side faces with an arched first and second lower guide rail outwardly project therefrom, respectively. A first wing clamp is positioned on the first lower guide rail while a second wing clamp is positioned on the second lower guide rail. A primary fastener attaches the first wing clamp and the second wing clamp to the body, the primary fastener being movable between a first position wherein the first wing clamp and the second wing clamp are rigidly fixed to the body and a second position wherein the first wing clamp and the second wing clamp can freely slide along the first lower guide rail and the second lower guide rail, respectively. Structure is also provided for releasably securing a bicycle seat to the first wing clamp and the second wing clamp independent of movement of the primary fastener.

23 Claims, 15 Drawing Sheets

US 8,894,141 B2

BICYCLE SEAT CLAMP

CROSS-REFERENCE TO RELATED APPLICATIONS

Not applicable.

BACKGROUND OF THE INVENTION

1. The Field of the Invention

The present invention relates to bicycle seat clamps.

2. The Relevant Technology

A conventional bicycle seat includes a top surface on which a bicyclist sits and a bottom surface from which mounting rods extend. Other bicycle seats have a single "I beam" style mounting rod structure. A seat clamp can be secured to the mounting rods or rod and is used to secure the seat to the bicycle frame. Many seat clamps permit a user to manually adjust the position of the seat relative to the frame. For example, some seat clamps permit a user to adjust the position of the seat forward and rearward relative to the frame. This forward or rearward movement of the seat is referred to herein as "longitudinal displacement." Some seat clamps permit a user to adjust the forward or rearward tilt of the seat relative to the frame. Such adjustability of the seat permits an operator to optimize comfort and/or performance.

Conventional seat clamps, however, have a number of shortcomings. For example, most adjustable seat clamps require that the longitudinal displacement and tilt of the seat be simultaneously adjusted. This design makes it difficult to fine tune seat adjustment when only one of the longitudinal displacement or tilt adjustments is desired. Furthermore, adjustable seat clamps are often structurally complex, difficult to adjust, and can have increased weight. In addition, most adjustable seat clamps have a fixed seat clamping position and permit only very limited longitudinal displacement of the seat. While some adjustable seat clamps can be reversed to provide a second clamping offset position, those designs do not provide usable tilt adjustment ranges when in that reversed position.

Accordingly, what is needed in the art are seat clamps that improve on one or more of the above shortcomings.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope. In the drawings, like numerals designate like elements. Furthermore, multiple instances of an element may each include separate letters appended to the element number. For example two instances of a particular element "20" may be labeled as "20a" and "20b". In that case, the element label may be used without an appended letter (e.g., "20") to generally refer to every instance of the element; while the element label will include an appended letter (e.g., "20a") to refer to a specific instance of the element.

DETAILED DESCRIPTION OF THE PREFERRED EMBODIMENTS

Figure 1:
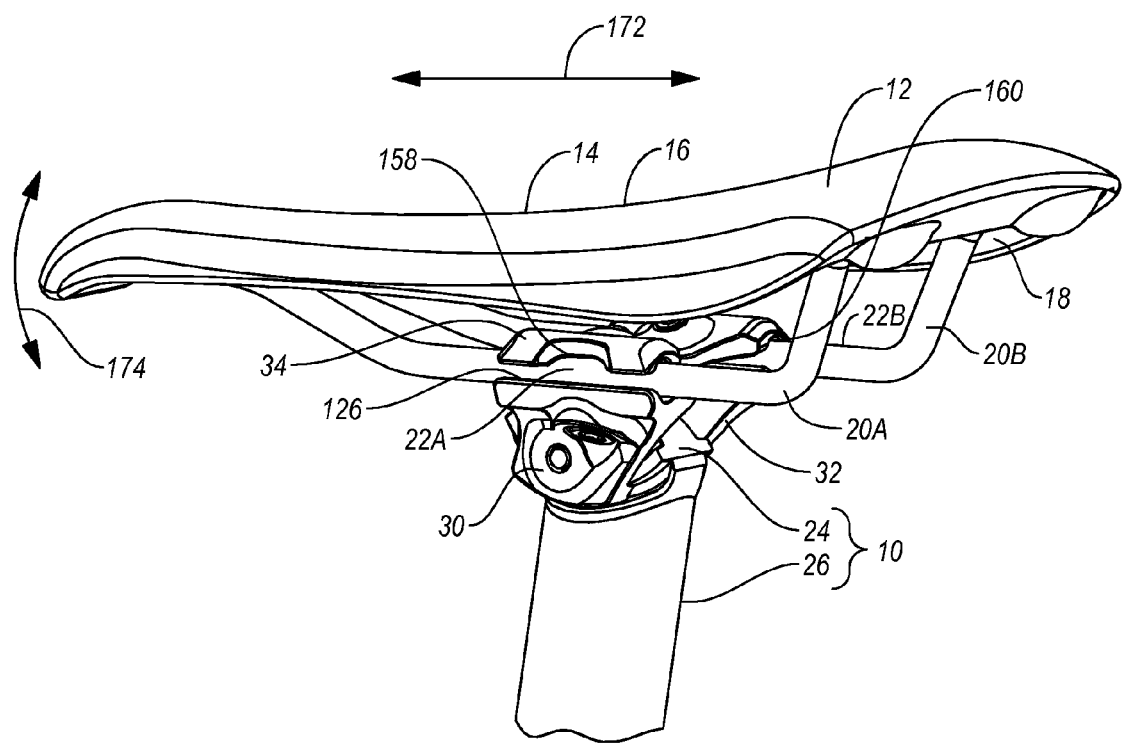
FIG. 1 is one embodiment of an inventive seat clamp assembly mounted to a bicycle seat.

In the following detailed description, reference is made to the accompanying drawings, which form a part hereof. In the drawings, similar symbols typically identify similar components, unless context dictates otherwise. The embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. It will also be understood that any reference to a first, second, etc. element in the claims or in the detailed description, is not meant to imply numerical sequence, but is meant to distinguish one element from another unless explicitly noted as implying numerical sequence.

In addition, as used in the specification and appended claims, directional terms, such as "top," "bottom," "up," "down," "upper," "lower," "proximal," "distal," "horizontal," "vertical," and the like are used herein solely to indicate relative directions and are not otherwise intended to limit the scope of the invention or claims.

Depicted in FIG. 1 is one embodiment of an inventive seat clamp assembly 10 incorporating features of the present invention. Seat clamp assembly 10 is used to secure a bicycle seat 12 to a frame of a bicycle. Bicycle seats come in a variety of different configures based on intended use and personal preference. In general, however, bicycle seat 12 comprises a seat portion 14 having a top surface 16 that is configured to receive a bicyclist and an opposing bottom surface 18. Projecting from bottom surface 18 are a pair of generally U-shaped mounting rods 20A and 20B. Each mounting rod 20A and 20B has a central, linear mounting section 22A and 22B, respectively, that are disposed in parallel alignment. As is discussed below in greater detail, seat clamp assembly 10 is secured to mounting sections 22 of rods 20 so as to permit select and independent control of the longitudinal displacement and tilt of bicycle seat 12 relative to the bicycle frame.

Figure 2:
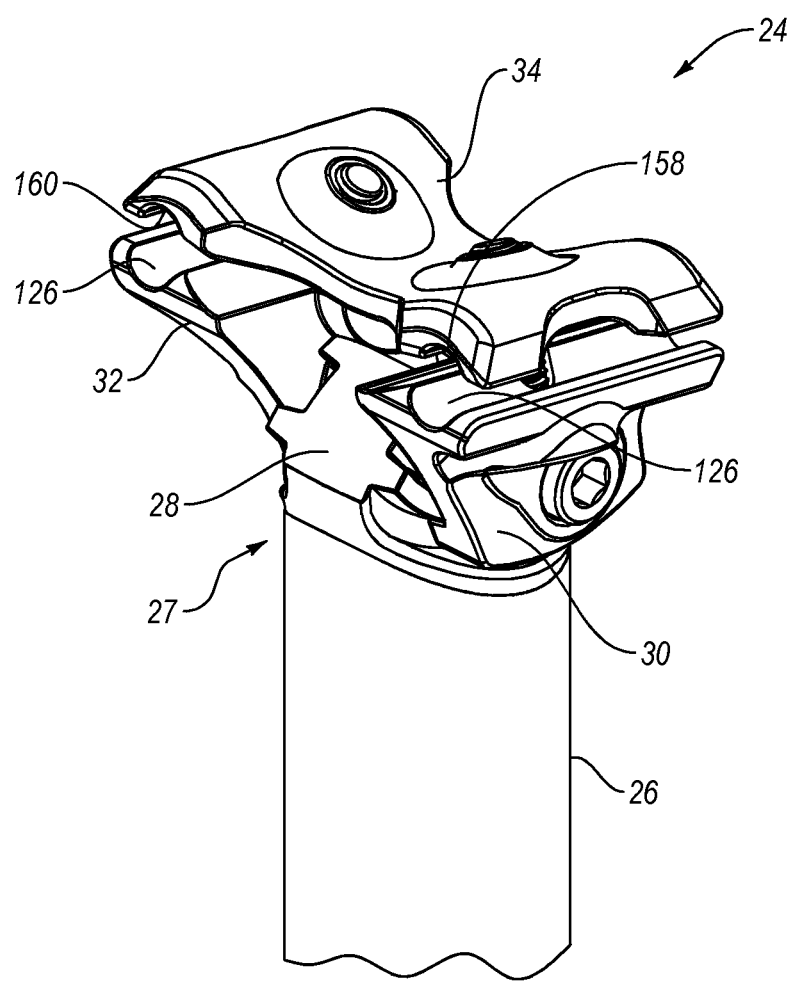
FIG. 2 is an enlarged perspective view of the seat clamp assembly shown in FIG. 1.
Figure 3:
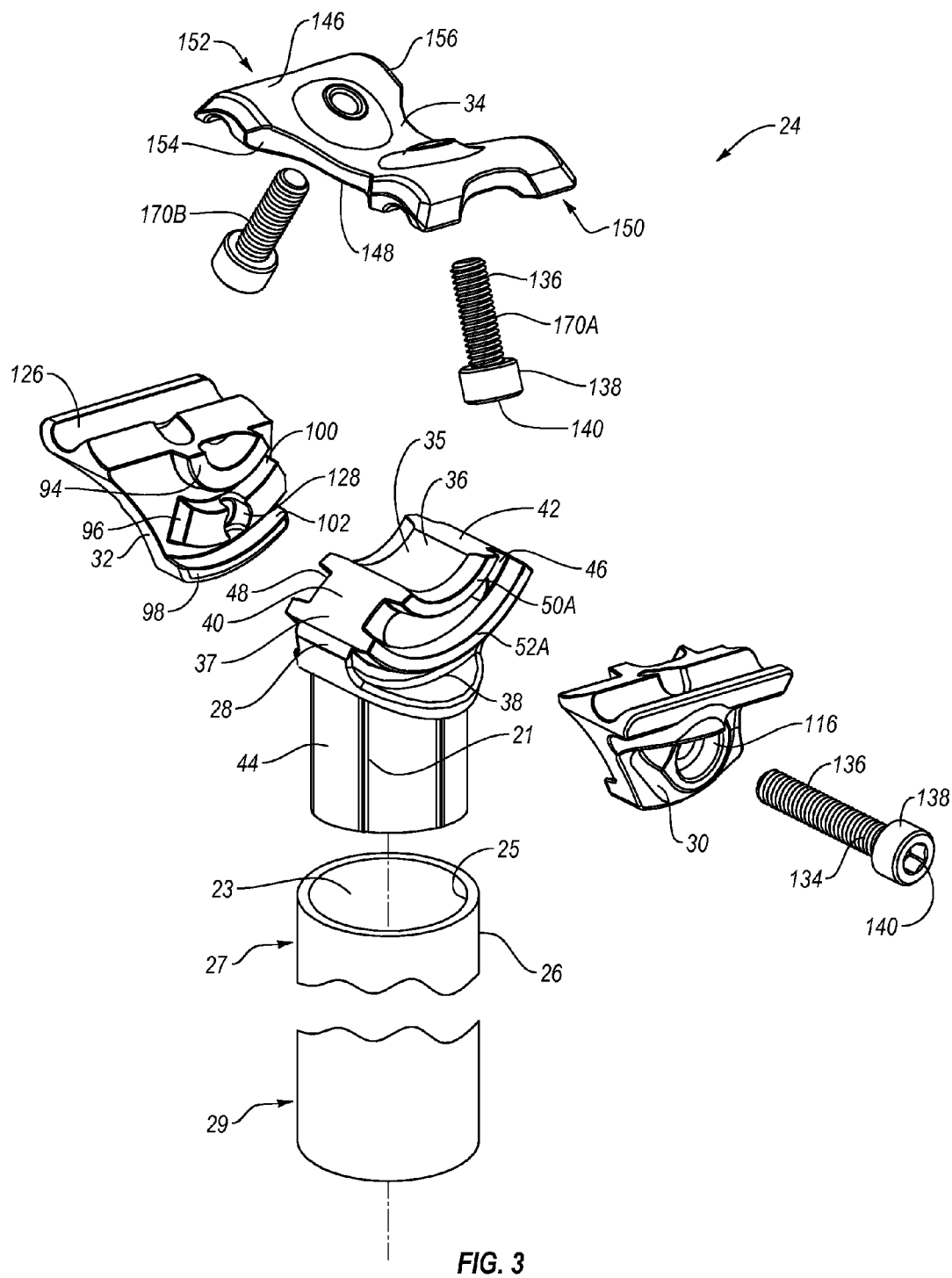
FIG. 3 is an exploded perspective view of the seat clamp assembly depicted in FIG. 2.

With continued reference to FIG. 1, seat clamp assembly 10 comprises a seat clamp 24 secured to a post 26. As is commonly known in the art, post 26 can be mounted to the bicycle frame so that the height of seat 12 can be selectively adjusted relative to the frame. As depicted in FIGS. 2 and 3, post 26 has a cylindrical configuration with an interior surface 25 that bounds a passageway 23 that extends from a first end 27 to an opposing second end 29. Post 26 can be any desired length and is typically made of a metal, such as aluminum, although other materials can also be used. Post 26 can also have a non-cylindrical shape.

As depicted in FIG. 2, seat clamp 24 generally comprises a base 28 having a first wing clamp 30 and an opposing second wing clamp 32 mounted on opposing sides thereof. In turn, a saddle clamp 34 spans between and is adjustably mounted to wing clamps 30 and 32.

More specifically, as depicted in FIG. 3, base 28 comprises a guide body 35 having a stem 44 downwardly projecting therefrom. Stem 44 has a cylindrical configuration and is designed to be received within passageway 23 at first end 27 of post 26 for securing base 28 to post 26. A plurality of radially spaced apart, outwardly projecting engaging ribs 21 can extend along the length of the exterior surface of stem 44 to help facilitate engagement with post 26. Stem 44 is typically secured to post 26 by an adhesive. In other embodiments, however, stem 44 can be secured to post 26 by press fit, welding, fastener, clamp or the like. In addition, stem 44 can be replaced with a collar that fits over the end of post 26 or stem 44 can be eliminated and base 28 and post 26 can be integrally formed as a single unitary structure.

Guide body 35 includes a central body 37 having a top surface 36 and an opposing bottom surface 38 that extend between a first end face 40 and an opposing second end face 42. In the embodiment depicted, top surface 36 has a concave curvature, bottom surface 38 has a convex curvature, and end faces 40 and 42 are planer or rounded. Stem 44 downwardly projects from bottom surface 38 and is used for engaging with post 26. Body 28 further comprises a first side face 46 and an opposing second side face 48 that longitudinally extend between opposing end faces 40 and 42. In the depicted embodiment, each side face 46 and 48 has an arched contour. Outwardly projecting from first side face 46 is an elongated upper guide rail 50A and a spaced apart lower guide rail 52A that both longitudinally extend between end faces 40 and 42. Each guide rail 50A and 52A is arched along the length thereof with the arch being complementary to the arch of first side face 46 at the location from which they project. The guide rails 50A and 52A each have a central longitudinal axis with a radius of curvature that is typically in a range between about 1 cm to about 4 cm with about 1.2 cm to about 2.7 cm being more common, the radius of curvature of the guide rail 52A being larger than the radius of curvature of the guide rail 50A. Other radius of curvatures can also be used.

Figure 4A:
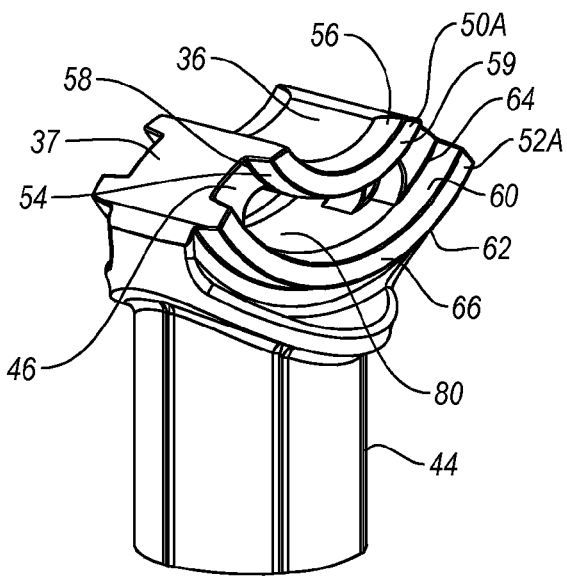
FIG. 4A is a right side perspective view of the base of the seat clamp shown in FIG. 3.
Figure 4B:
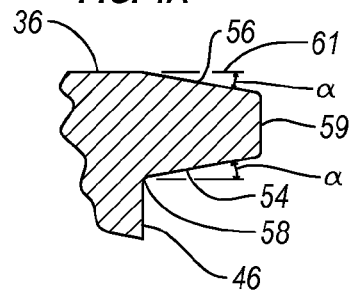
FIG. 4B is an enlarged cross sectional side view of a guide rail of the base shown in FIG. 4A.

As depicted in FIG. 4A, upper guide rail 50A has an inside face 54 and an opposing outside face 56 that longitudinally extend along the length of guide rail 50A. Faces 54 and 56 both inwardly taper along the length therefrom from a base 58 at which upper guide rail 50A connects to first side face 46 to an outer end face 59. As depicted in FIG. 4B, inside face 54 and outside face 56 inwardly taper at an angle $\alpha$ relative to an axis 61 that is either parallel to top surface 36 or is orthogonal to first side face 46 or outer end 59. The angle $\alpha$ is typically in a range between about 1° to about 30° with about 5° to about 30° being more common. Other angles can also be used. The angle of taper of inside face 54 and outside face 56 are typically the same but can be different.

As with upper guide rail 50A, lower guide rail 52A has an inside face 60, that faces inside face 54, and an opposing outside face 62 that longitudinally extend along the length of lower guide rail 52A and that inwardly taper from a base 64 to an outer end face 66. Faces 60 and 62 can taper within the same range of angles as discussed above with regard to upper guide rail 50A and can taper at the same angle as upper guide rail 50A or at a different angle.

Figure 4C:
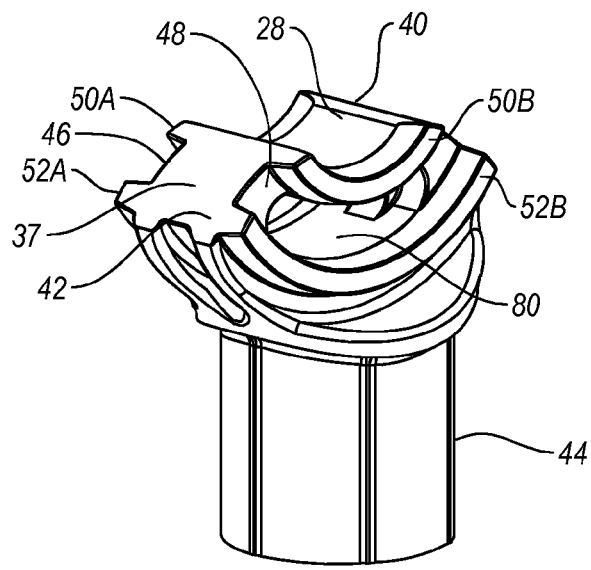
FIG. 4C is a left side perspective view of the base shown in FIG. 4A.

As depicted in FIG. 4C, outwardly projecting from second side face 48 of central body 37 is an upper guide rail 50B and a spaced apart lower guide rail 52B. Guide rails 50B and 52B are a mirrored configuration of guide rails 50A and 52A and are positioned at the same relative locations on second side face 48, like features between guide rails 50A and 50B and between guide rails 52A and 52B being identified by like reference characters.

As depicted in FIGS. 4A and 4C, an elongated slot 80 extends through central body 37 between opposing side faces 46 and 48 at a location between upper guide rails 50 and lower guide rails 52. Slot 80 has an elongated arched curvature with a central longitudinal axis having a radius of curvature within the range of the radius of curvature for upper rails 50 and lower rails 52 as discussed above. In one embodiment, slot 80 can have a width that 50% to 100% and more commonly 80% to 100% of the distance between upper guide rail 50 and lower guide rail 52 and a length that is typically in a range between 50% to 95% and more commonly between 70% to 90% of the length of central body 37 between end faces 40 and 42.

Figure 5A:
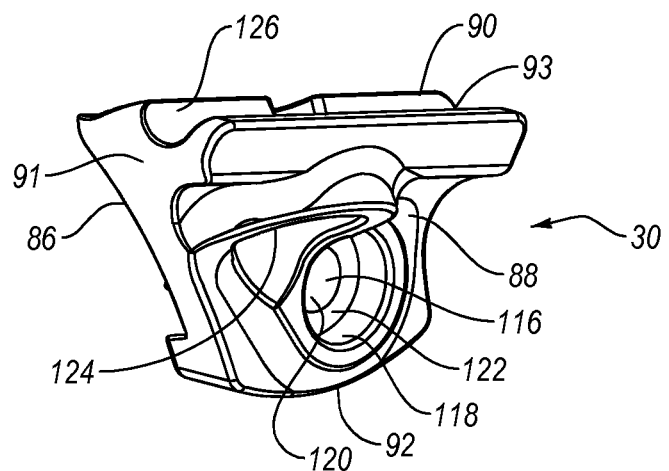
FIG. 5A is an outside perspective view of a wing clamp of the clamp assembly shown in FIG. 3.
Figure 5B:
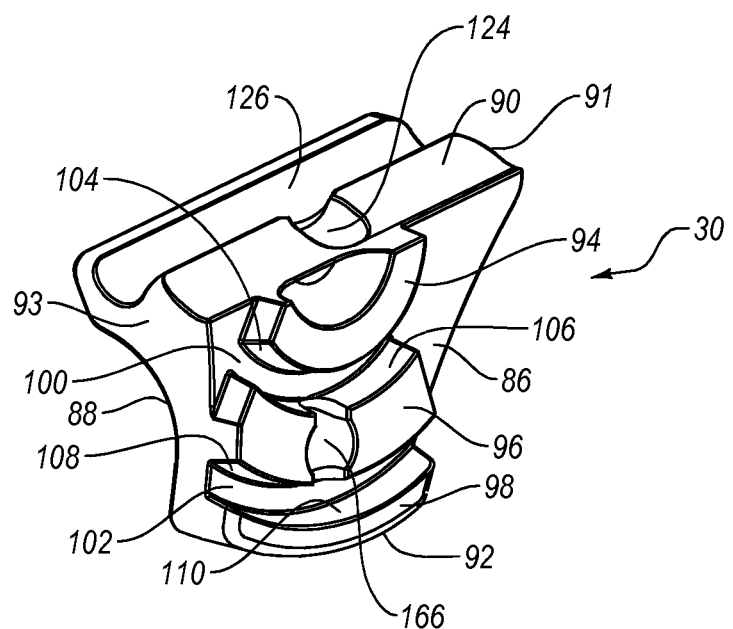
FIG. 5B is an inside perspective view of the wing clamp shown in FIG. 5A.

As depicted in FIGS. 5A and 5B, first wing clamp 30 comprises an inside face 86 and an opposing outside face 88 that extend between a top surface 90 and opposing bottom surface 92 and between a front face 91 and an opposing back face 93. As depicted in FIG. 5B, outwardly projecting from inside face 86 are three horizontally disposed retention rails 94, 96, and 98. Retention rails 94, 96, and 98 are arched along the length thereof with a retention channel 100 being bounded between rails 94 and 96 and a retention channel 102 being bounded between rails 96 and 98. Retention channels 100 and 102 have a configuration substantially complementary to guide rails 50A and 52A, respectively.

More specifically, retention rail 94 has a lower guide surface 104 while middle retention rail 96 has an upper guide surface 106 that bound retention channel 100 therebetween. Guide surfaces 104 and 106 outwardly flare complementary to faces 56 and 54, respectively, of upper guide rail 50A of body 28 (FIG. 4A). Similarly, retention rail 96 has a lower guide surface 108 while retention rail 98 has an upper guide surface 110 that bound retention channel 102 therebetween.

Guide surfaces 108 and 110 outwardly flare complementary to faces 60 and 62, respectively, of lower guide rail 52A of body 28 (FIG. 4A).

Figure 6:
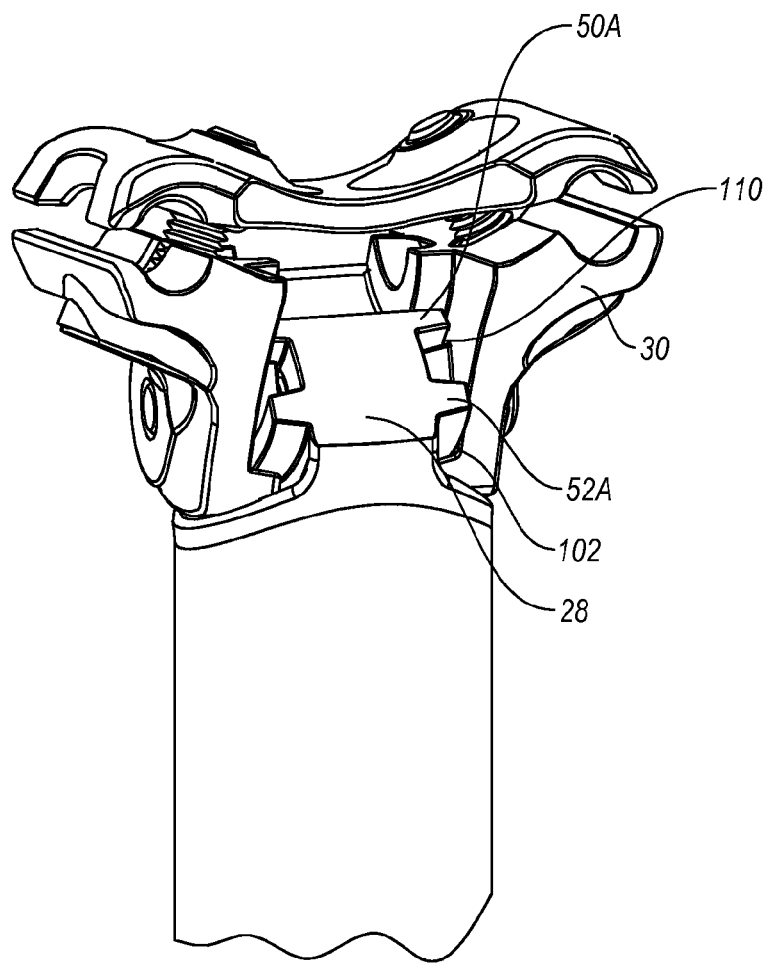
FIG. 6 is a front perspective view of the assembled seat clamp assembly shown in FIG. 2.

First wing clamp 30 is configured so that in an assembled configuration, as shown in FIG. 6, first wing clamp 30 can be positioned on body 28 so that when loosely fitting guide rails 50A and 52A can freely slide within retention channels 100 and 102, respectively but that as wing clamp 30 is drawn against body 28, guide rails 50A and 52A wedge into retention channels 100 and 102, respectively, so as to form a secure engagement therebetween.

As depicted in FIGS. 5A and 5B, a through-hole 116 laterally passes through first wing clamp 30 from outside face 88 to inside face 86. Through-hole 116 is shown as passing through center retention rail 96. Through-hole 116 includes a larger outer portion 118 formed on outside face 88, a constricted inner portion 120 that passes through inside face 86 and an annular shoulder 122 extending therebetween. An attachment hole 124 extends from outside face 88 through top surface 90. As with through-hole 116, attachment hole 124 also includes an enlarged outer portion 118 formed on outside face 88, a constricted inner portion 120 and a shoulder 122 extending therebetween.

Recessed along top surface 90 of first wing clamp 30 and extending from front face 91 to back face 93 is a rod channel 126 that is configured to receive mounting rod 20 of bicycle seat 12 (FIG. 1). Attachment hole 124 extends through top surface 90 adjacent to rod channel 126.

As depicted in FIG. 3, second wing clamp 32 is the mirror image of first wing clamp 30. Like elements between wing clamps 30 and 32 are identified by like reference characters. The one difference between wing clamps 30 and 32 is that in contrast to having through-hole 116 extending through wing clamp 30, second wing clamp 32 has an engaging hole 128 passing therethrough which has a threaded interior surface for engaging with a fastener.

During assembly, wing clamps 30 and 32 are positioned on opposing sides of body 28 with guide rails 50A and B and 52A and B of guide body 35 being received within corresponding retention channels 100 and 102 of wing clamps 30 and 32. A primary fastener 134 has a threaded shaft 136 with an enlarged head 138 mounted on the end thereof. A polygonal socket 140 is recessed on the end face of head 138 for receiving a driver for rotating primary fastener 134. With wing clamps 30 and 32 disposed on guide body 35, primary fastener 134 can be passed through through-hole 116 of first wing clamp 30, through slot 80 of guide body 35, and then threaded into engaging hole 128 of wing clamp 32. When primary fastener 134 is loose, wing clamps 30 and 32 can freely side in an arched path on guide body 35 by arched guide rails 50A and B and 52A and B sliding in arched retention channels 100 and 102 of corresponding wing clamps 30 and 32. Concurrently therewith, primary fastener 134 slides within slot 80 of guide body 35.

As primary fastener 134 is tightened, tapered guide rails 50A and B and 52A and B are wedged within tapered retention channels 100 and 102 of corresponding wing clamps 30 and 32 so as to rigidly fix wing clamps 30 and 32 relative to body 28. As a result of guide rails 50 and 52 being spaced apart, and primary fastener 134 passing between guide rails 50 and 52, wing clamps 30 and 32 are uniformly drawn together in a stable fashion during tightening of primary fastener 134 as opposed to top surfaces 90 or bottom surfaces 92 of wing clamps 30 and 32 being separately drawn together.

In the depicted embodiment, primary fastener 134 is depicted as a threaded bolt that threads into wing clamp 32. In alternative embodiments, fastener 134 and wing clamp 32 can have a variety of different configurations for tightening wing clamps 30 and 32 to guide body 35. For example, primary fastener 134 and wing clamp 32 can be modified so that a bayonet connection is formed therebetween. In other embodiments, primary fastener 134 can freely pass through wing clamp 32 and a nut or lever clamp can be mounted on the end thereof. A variety of other configurations can also be used. The above discussed embodiments are examples of means for selectively tightening wing clamps 30 and 32 to guide body 35. Other examples of such means are discussed below.

Figure 7:
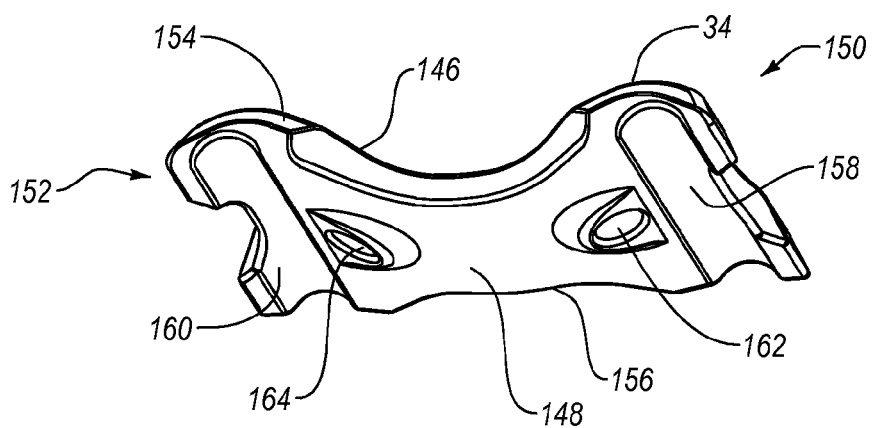
FIG. 7 is a bottom perspective view of a saddle clamp of the clamp assembly shown in FIG. 6.

As depicted in FIGS. 3 and 7, saddle clamp 34 has a top surface 146 and an opposing bottom surface 148 that longitudinally extend between a first end 150 and an opposing second end 152. Saddle clamp also includes a front face 154 and an opposing back face 156 that likewise extend between opposing ends 150 and 152. Recessed on first end 150 of bottom surface 148 is a rod channel 158 that longitudinally extends between front face 154 and back face 156. Similarly, recessed on second end 152 of bottom surface 148 is a rod channel 160 that longitudinally extends between front face 154 and back face 156. Rod channels 158 and 160 are configured to receive mounting rods 20 of seat 12 (FIG. 1). Threaded engaging holes 162 and 164 are also formed on bottom surface 148. Threaded engaging holes 162 and 164 are depicted as passing all the way through saddle clamp 134 but can also be formed as blind sockets, threaded nuts, or inserts.

As depicted in FIG. 3, a pair of secondary fasteners 170A and 170B are used to secure saddle clamp 34 to wing clamps 30 and 32. Each of secondary fasteners 170 includes threaded shaft 136, enlarged head 138, and polygonal socket 140 as previously discussed with regard to fastener 134. During assembly, saddle clamp 134 is placed over wing clamps 30 and 32. Fasteners 170A and 170B are then advanced through attachment holes 124 on wing clamps 30 and 32 and threaded into engaging holes 162 and 164, respectively. The same alternatives as discussed above with regard to primary fastener 134 and wing clamp 32 can also be used with secondary fasteners 170 and saddle clamp 34.

As depicted in FIG. 1, during use saddle clamp 34 is mounted on wing clamps 30 and 32 so that mounting sections 22A and B of mounting rods 20A and B are received within the rod channels 158 and 160 of saddle clamp 34 aligned with rod channels 126 on wing clamps 30 and 32. With secondary fasteners 170A and 170B loose, mounting rods 20A and B and thus the remainder of seat 12 are free to slide forward and backward along arrow 172 relative to seat clamp 24. This movement of seat 12 permits longitudinal displacement of seat 12 relative to seat clamp 24 and the remainder of the bicycle. By tightening secondary fasteners 170A and B, mounting rods 20A and B are clamped between saddle clamp 34 and wing clamps 30 and 32 so that seat 12 is rigidly fixed to saddle clamp 34 and wing clamps 30 and 32. By loosing primary fastener 134, wing clamps 30 and 32 and thus seat 12 secured thereto, can be freely tilted forward or backward along arrow 174 relative to guide body 35 and the bicycle frame. By securing primary fastener 134, seat 12 is rigidly fixed at the desired tilt orientation.

In view of the foregoing, the above discussed embodiment of the present invention enables a user to independently adjust the longitudinal displacement of seat 12 or the tilt of seat 12 without having to adjust or loosen the other of the longitudinal displacement or tilt of seat 12. This ability to independently adjust the longitudinal displacement and tilt of seat 12 makes it easier and quicker to adjust seat 12 to a desired optimal seat orientation. Furthermore, seat clamp 24 is lightweight and simple to operate. All of the parts of seat clamp 24 can be made from metal, typically aluminum. However, other materials, such as composites, can also be used.

Figure 8A:
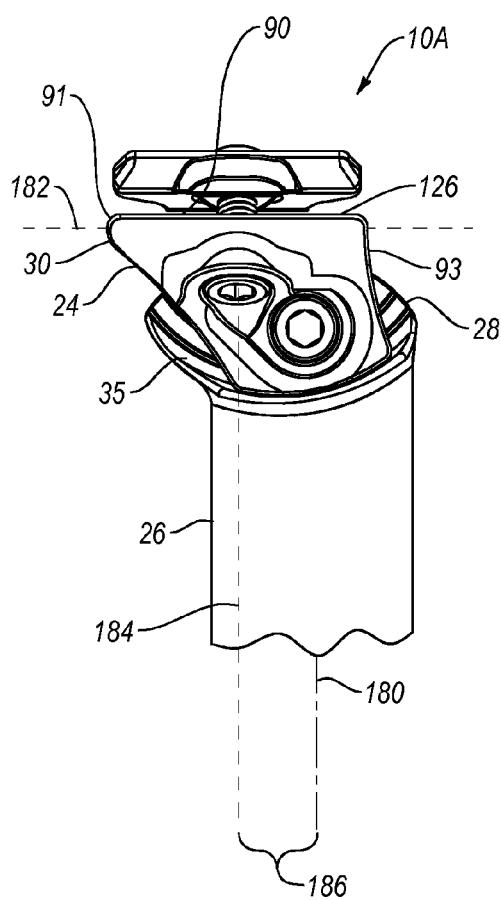
FIG. 8A is an elevational side view of the clamp assembly shown in FIG. 3.

Although embodiments of the present invention are designed to enable a user to selectively adjust the longitudinal displacement of seat 12 relative to post 26, it can be desired to have seat clamp 24 configured so that seat 12 is initially offset from post 26 on initial mounting. The desired offset can be based on personal preference or to enable optimal positioning of a biker on a bike frame based on the physical characteristics of the biker and/or the bike frame. For example, depicted in FIG. 8A, is seat clamp assembly 10 which includes seat clamp 24 mounted on seat post 26. Seat post 26 has a central longitudinal axis 180 passing therethrough. Wing clamp 30 of seat clamp 24 includes rod channel 126 having a central longitudinal axis 182 extending along the length thereof.

When wing clamp 30 is orientated so that axis 180 is perpendicular to axis 182, an imaginary plane 184 disposed normal to axis 182 centrally passes through rod channel 126 so as to bisect rod channel 126. The distance between axis 180 of post 26 and plane 184 when viewed from the side of seat clamp 24 as shown in FIG. 8A defines an offset 186 between post 26 and seat clamp 24. Offset 186 can also be measured along a line between axis 180 of post 26 and plane 184 where the line extends normal to plane 184. Offset 186 is typically in a range between 4 mm to 40 mm with 4 mm to 25 mm or 4 mm to 11 mm being more common and can extend on either side of axis 180. In other embodiments offset 186 can be 5 mm, 10 mm, 15 mm, 20 mm, 25 mm, or 50 mm each in a range of +/−6 mm. Other dimensions can also be used. In still other embodiments, offset 186 can be zero.

Figure 9:
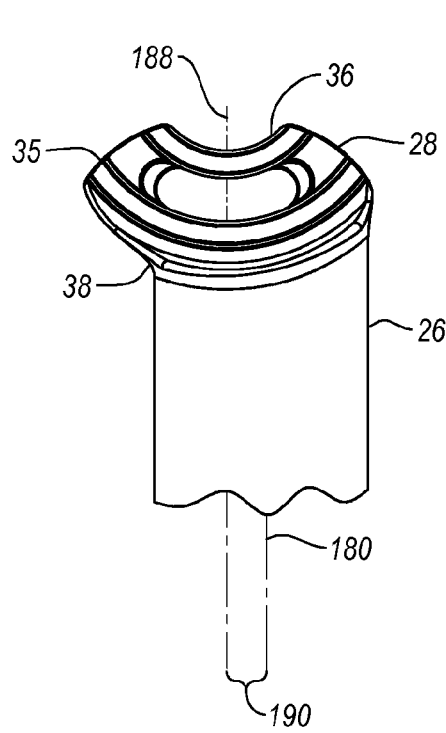
FIG. 9 is an elevated side view of the body of the clamp assembly shown in FIG. 3.

Offset 186 is typically achieved by using one of two different techniques or a combination of both. In one technique, as depicted in FIG. 9, the offset 186 can be achieved by forming base 28 so that guide body 35 thereof is longitudinally offset from stem 44 (FIG. 4A). As a result, guide body 35 is longitudinally offset from post 26 when secured thereto. More specifically, when base 28 is mounted on post 26, guide body 35 has a central vertical axis 188 (FIG. 9) passing through top surface 36 and bottom surface 38 and that is disposed parallel to axis 180. However, as a result of the offset of guide body 35 relative to stem 44, vertical axis 188 is offset from axis 180 by an offset 190. Depending on the configuration of wing clamps 30 and 32, offset 190 can account for all or some of offset 186. Base 28 can be manufactured to achieve any desired offset 190. Offset 190 can have the same dimensions as offset 186 as discussed above.

Figure 8B:
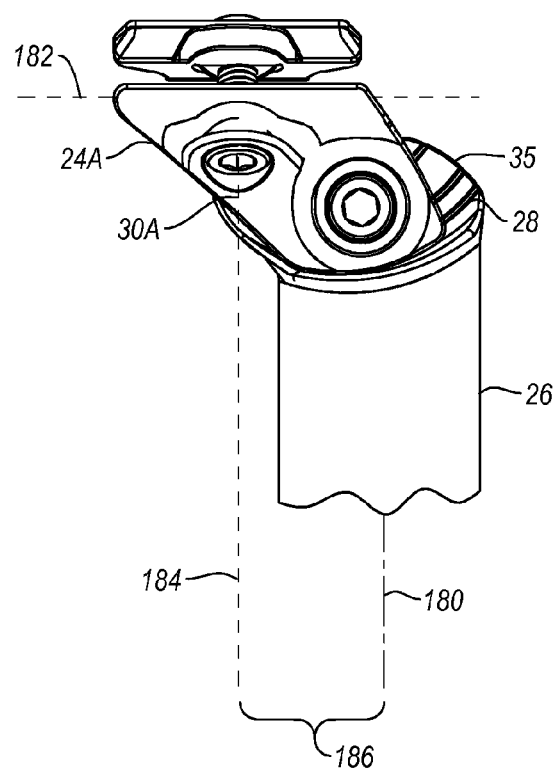
FIG. 8B is an elevated side view of an alternative embodiment of a seat clamp assembly having elongated wing clamps.
Figure 10A:
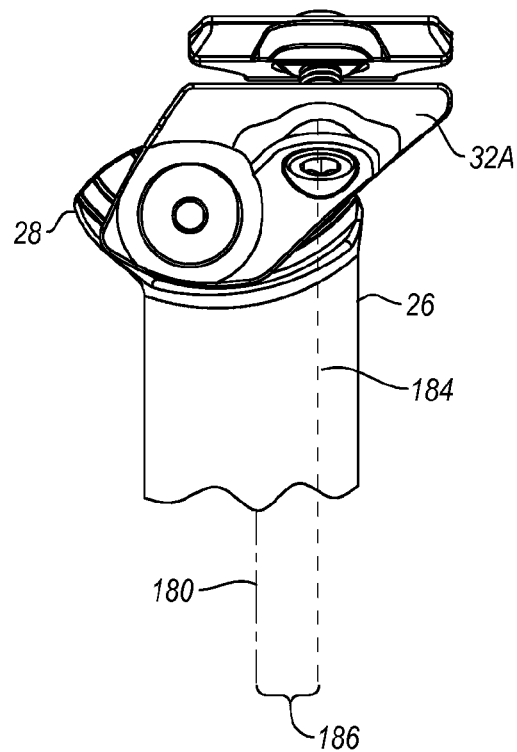
FIG. 10A is an elevated side view of the clamp assembly shown in FIG. 8B wherein the wing clamps have been reversed on the base.

The other technique for achieving offset 186 is by modifying the configuration of wing clamps 30 and 32. For example, in the embodiment depicted in FIG. 8B, a seat clamp 24A is mounted on post 26. Seat clamp 24A includes base 28, the same as in FIG. 8A, but also includes a wing clamp 30A and wing clamp 32A (FIG. 10A). Wing clamps 30A and 32A have the same structural elements as wing clamps 30 and 32 but are longitudinally elongated so that offset 186 in FIG. 8B is larger than offset 186 in FIG. 8A. Accordingly, by adjusting the configuration of body 24 and/or wing clamps 30, 32, seat clamp 24 can be designed with an initial offset 186 of a desired dimension. Furthermore, as discussed above, seat 12 can still be longitudinally displaced forward and backward relative to seat clamp 24 or 24A by loosening secondary fasteners 170A and B as discussed above.

Figure 10B:
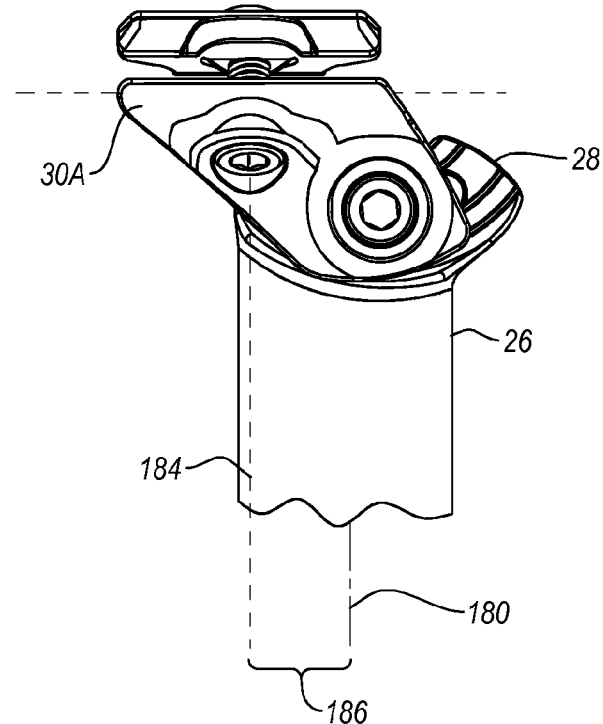
FIG. 10B is an elevated side view of the clamp assembly shown in FIG. 8B wherein the base and post have been rotated 180° but the wing clamps have retained their original orientation.

Select embodiments of the present invention are also uniquely configured so that wing clamps 30 and 32 can be reversed on base 28 so as to face in the opposite direction. This design enables further adjustment of offset 186. For example, in the embodiment depicted in FIG. 8B, wing clamps 30A and 32A are mounted on base 28 in a first orientation to form a positive offset 186 between axis 180 and plane 184 that extends forward of axis 180. In contrast, in the embodiment depicted in FIG. 10A, wing clamps 30A and 32A have been reversed to be on opposite sides of base 28 and to face the opposite direction. As a result, a negative offset 186 is formed that extends behind axis 180. In yet another embodiment, post 26 having base 28 mounted thereon can be rotated 180°. Because base 28 is initially offset from post 26, simply rotating post 26 180° while retaining wing clamps 30A and 32A in their original orientation, as depicted in FIG. 10B, results in a smaller offset 186 relative to FIG. 8B. With post 26 and base 28 in the reversed position, wing clamps 30A and 32A can again be reversed to produce a larger negative offset relative to FIG. 10A. Thus, offset 186 can be adjusted by using any combination of the orientation of post 26 and base 28 and the orientation of wing clamps 30 and 32.

In all of the above discussed configurations, seat clamp 24 operates in the same way and seat 12 can be further adjusted longitudinally by loosening secondary fasteners 170A and B and the tilt of seat 12 can be adjusted by loosening primary fastener 134. To enable seat clamp 24 to operate in the same way independent of the orientation of base 28 or wing clamps 30 and 32, it is noted that upper rails 50 and lower rails 52 are typically symmetrically formed on base 28. For example, as depicted in FIG. 9, for a plane that passes through central axis 188 of base 28 parallel to central axis 180 and normal to the side of rails 50 and 52, i.e., where the plane extends in and out of the page, the plane bisects rails 50 and 52 with the portions of the rails on opposing sides of the plane being symmetrical. Expressed in other terms, where a plane bisects the first and second lower guide rail 52 and/or first and second upper guide rail 50, the bisected halves of each guide rail are symmetrical about the plane. In other embodiments, however, it is appreciated that upper rails 50 and lower rails 52 need not be symmetrically formed on base 28.

By reversing the position of wing clamps 30 and 32 and/or orientation of base 28, greater variability is provided with regard to adjustment and positioning of offset 186. For example, by using the combination of reversing the position of wing clamps 30 and 32 and/or base 28 and adjusting seat 12 relative to wing clamps 30 and 32, a larger range of offsets can be achieved which increases the ability of a user to achieve optimal seat placement. In one embodiment using the foregoing technique, it is appreciated that a range of offsets can be achieved that are in a range between +40 mm and −40 mm and more commonly between +20 mm and −20 mm or +10 mm and −10 mm. Other ranges can also be achieved.

Figure 11:
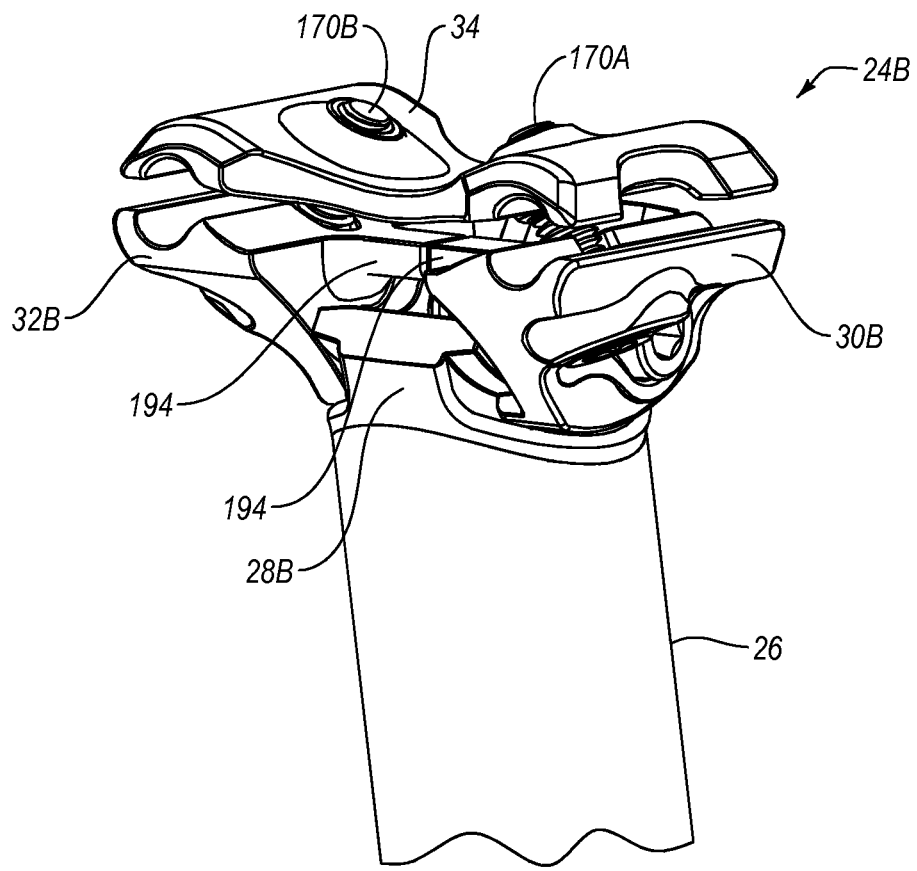
FIG. 11 is a perspective view of an alternative embodiment of a seat clamp.

It is appreciated that seat clamp 24 can have a variety of different configurations and yet still achieve all or at least some of the above discussed advantages. For example, depicted in FIG. 11 is a seat clamp 24B secured to post 26 and incorporating features of the present invention. Like elements between seat clamp 24B and seat clamp 24 are identified by like reference characters. Furthermore, disclosure and alternative embodiments previously discussed with regard to select elements of seat clamp 24 are also applicable to the like elements of seat clamp 24B. Seat clamp 24B includes a base 28B having wing clamps 30B and 32B mounting on the opposing sides thereof. In turn, previously discussed saddle clamp 34 secured to wing clamps 30B and 32B by fasteners 170A and 170B.

Figure 12:
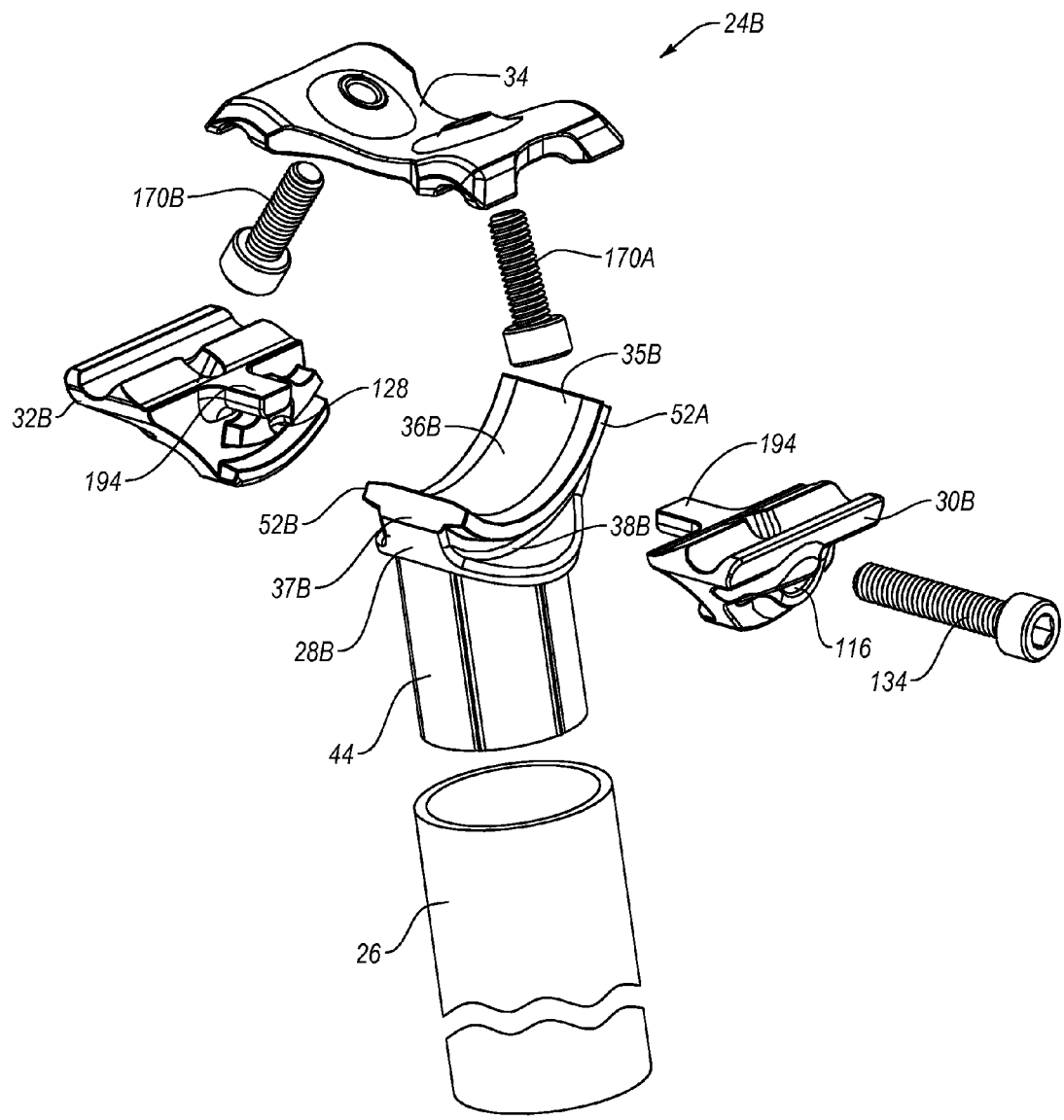
FIG. 12 is an exploded perspective view of the seat clamp shown in FIG. 11.

As depicted in FIG. 12, base 28B includes a guide body 35B having stem 44 downwardly projecting therefrom. Guide body 35B is similar to guide body 35 (FIG. 4A) except that the structure above lower guide rails 52A and B has been eliminated. For example, upper guide rails 50A and B, the upper portion of central body 37, and slot 80 have been eliminated. Guide body 35B includes a central body 37B having a top surface 36B and an opposing bottom surface 38B each with a radius of curvature. Tapered lower guide rails 52A and 52B, as previously discussed with regard to guide body 35, outwardly project from the opposing sides of central body 37B.

Figure 13:
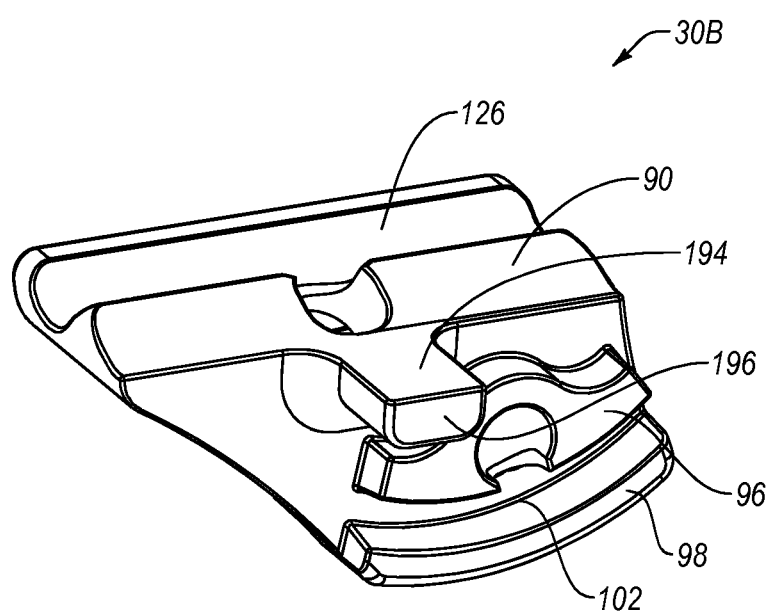
FIG. 13 is an enlarged inside perspective view of the wing clamp of the seat clamp shown in FIG. 11.

Wing clamps 30B and 32B are the same as wing clamps 30 and 32 as previously discussed (FIGS. 5A and B) except that upper retention rail 96 on inside surface 86 of each wing clamp has been replaced by an outwardly projecting bridge 194, as depicted in FIG. 13, that terminates at an end face 196. During assembly, wing clamps 30B and 32B are positioned on opposing sides of guide body 35 with lower guide rails 52A and 52B being received within corresponding retention channel 102 of wing clamps 30B and 32B. Primary fastener 134 is passed through through-hole 116 on wing clamp 30B, passed over top surface 36B of guide body 35B, and threaded into engaging hole 128 on wing clamp 32B.

With primary fastener 134 loose, wing clamps 30B and 32B can freely slide along lower guide arched rails 52A and B. Because upper guide rails 50A and 50B have been eliminated, wing clamps 30B and 32B at the upper ends thereof would naturally tend to fold in towards each other at primary fastener 135 is tightened. In the present embodiment, however, as fastener 134 is tightened, lower guide rails 52A and B wedge into retention channels 102 so as to secure wing clamps 30B and 32B to guide body 35B. Concurrently, end faces 196 of bridges 194 of wing clamps 30B and 32B butt together to ensure that the upper ends of wing clamps 30B and 32B maintain a desired orientation.

Saddle clamp 34 is secured to wing clamps 30B and 32B using fasteners 170A and 170B as previously discussed with regard to seat clamp 24. Seat clamp 24B can thus be used to independently adjust the longitudinal displacement of seat 12 and be used to independently adjust the forward or backward tilt of seat 12 in the same manner as previously discussed with regard to seat clamp 24. Likewise, wing clamps 30B and 32B can be reversed on guide body 35B to further adjust the offset between wing clamps 30B and 32B and post 26. The offset can further be adjusted by rotating post 26 and base 28B 180°.

Figure 14:
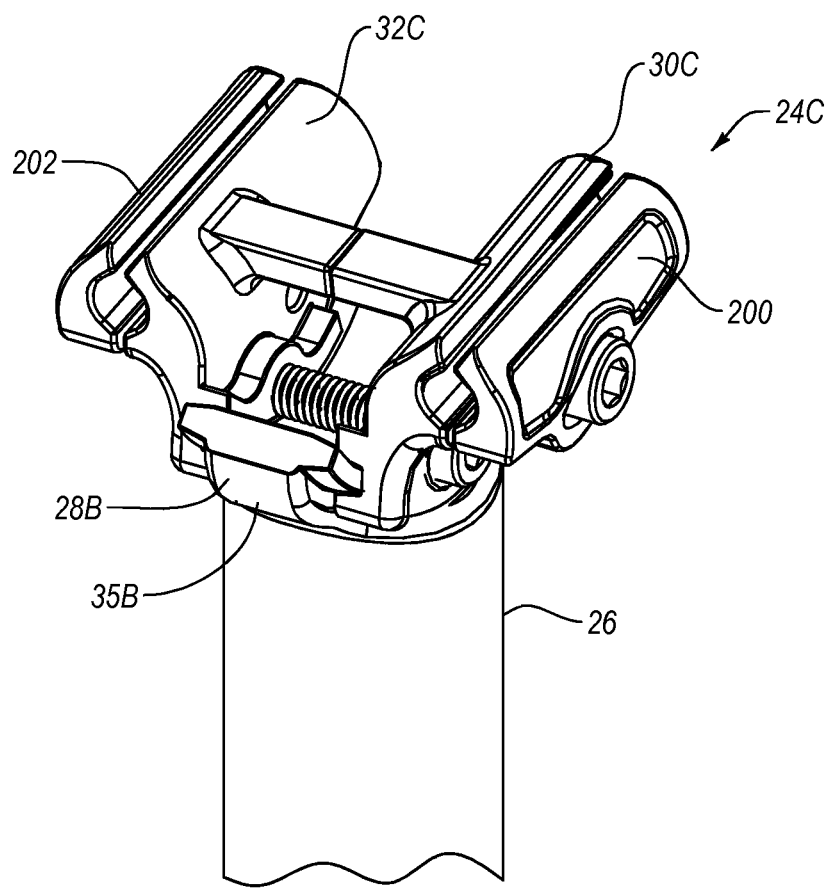
FIG. 14 is a perspective view of another alternative embodiment of a seat clamp.

Depicted in FIG. 14 is another alternative embodiment of a seat clamp 24C mounted on post 26 and incorporating features of the present invention. Like elements between seat clamps 24, 24B and 24C are identified by like reference characters. Furthermore, disclosure and alternative embodiments previously discussed with regard to select elements of seat clamps 24 and 24B are also applicable to the like elements of seat clamp 24C. Seat clamp 24C includes base 28B as previously discussed with regard to FIG. 12, a pair of wing clamps 30C and 32C mounted on opposing sides of guide body 35B, and a first side clamp 200 and a second side clamp 202 are mounted on wing clamps 30C and 32C, respectively.

Figure 15:
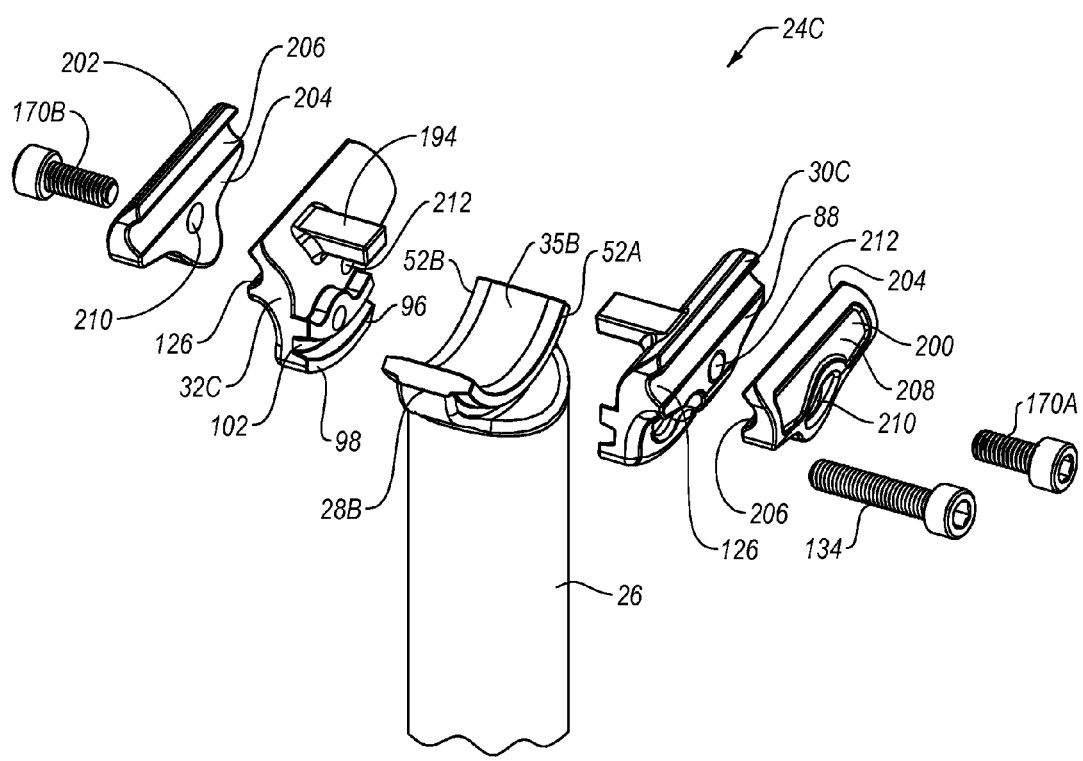
FIG. 15 is an exploded perspective view of the seat clamp shown in FIG. 14.

Depicted in more detail in FIG. 15, each wing clamp 30C and 32C includes retention rails 96 and 98, retention channel 102 disposed therebetween, and outwardly projecting bridge 194. However, in contrast to wing clamps 30B and 32C which include rod channel 126 along top surface 90, wing clamps 30C and 32C include rod channel 126 extending along outside face 88 thereof. In this embodiment, saddle clamp 34 has been eliminated and replaced by two separate side clamps 200 and 202. Each side clamp 200 and 202 includes an inside face 204 on which a rod channel 206 is recessed and an opposing outside face 208. A through-hole 210 extends through each side clamp 200 and 202 from outside face 208 to inside face 204. Each wing clamp 30C and 32C has a threaded engagement hole 212 mounted thereon. Wing clamps 30C and 32C mount to and operate on base 28B in the same manner as previously discussed with regard to seat clamp 24B.

For mounting seat clamp 24C to seat 12 (FIG. 1), wing clamps 30C and 32C coupled with base 28B are slid between mounting rods 20A and B so that mounting sections 22A and B are received within rod channels 126. Side clamps 200 and 202 are then positioned over the outside of mounting rods 20A and B so that mounting sections 22A and B are received within rod channels 206. Secondary fasteners 170 and 170B are then passed through through-holes 210 and threaded into engaging holes 212. As fasteners 170A and B are tightened, mounting rods 20A and B are clamped between wing clamps 30C and 32C and side clamps 200 and 202. Accordingly, by loosening secondary fasteners 170A and B, seat 12 can be longitudinally slid forward or backward relative to seat clamp 24C but when fasteners 170A and B are tightened, seat 12 is rigidly fixed to seat clamp 24C.

Figure 16:
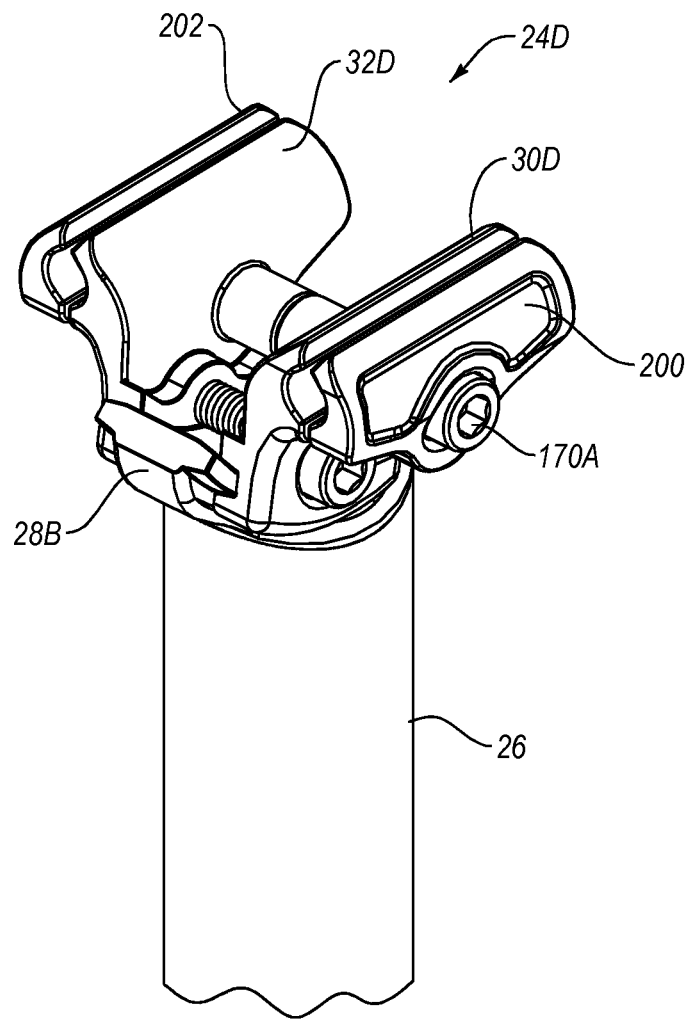
FIG. 16 is a perspective view of a final alternative embodiment of a seat clamp.

Depicted in FIG. 16 is still another alternative embodiment of a seat clamp 24D secured to post 26 and incorporating features of the present invention. Like elements between seat clamps 24, 24B, 24C, and 24D are identified by like reference characters. Furthermore, disclosure and alternative embodiments previously discussed with regard to select elements of seat clamps 24, 24B and 24C are also applicable to the like elements of seat clamp 24D. Seat clamp 24D is substantially similarly to seat clamp 24C except that seat clamp 24D has been modified so that only a single elongated secondary fastener 170A is required to secure side clamps 200 and 202 to associated wing clamps 30D and 32D. Specifically, seat clamp 24D comprises base 28B having wing clamps 30D and 32D mounted on opposing sides thereof in the same manner as previously discussed with regard to seat clamp 24C. In turn, side clamps 200 and 202 are mounted on wing clamps 30D and 32D, respectively.

Figure 17:
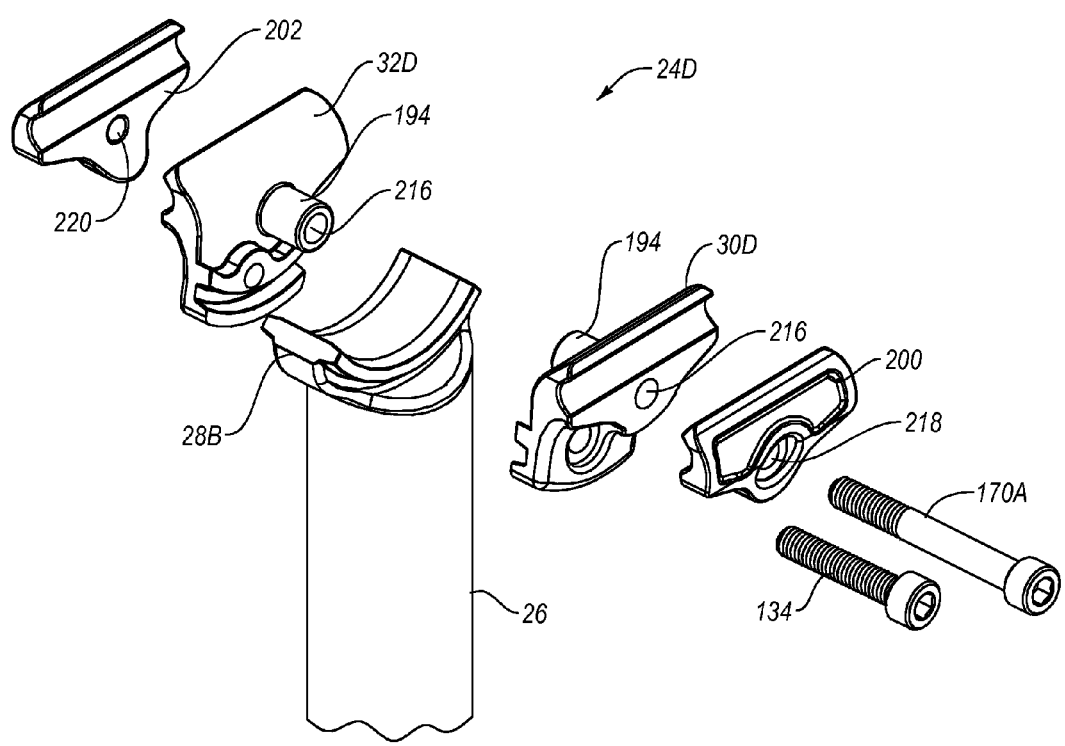
FIG. 17 is an exploded perspective view of the seat clamp shown in FIG. 16.

As depicted in FIG. 17, in contrast to wing clamps 30C and 32C (FIG. 15) which each have a threaded engaging hole 212 mounted thereon, each wing clamp 30D and 32D has a through-hole 216 that laterally passes therethrough, including through corresponding bridges 194. First side clamp 200 has a through-hole 218 extending therethrough while second side clamp 202 has a threaded engaging hole 220 formed thereon. Seat clamp 24D is secured to seat 12 in the same manner as previously discussed with regard to seat clamp 24C. However, in contrast to using two separate fasteners 170A and 170B, single elongated fastener 170A is passed through through-hole 218 of first side clamp 200, through through-holes 216 of wing clamps 30D and 32D, and then threaded into engaging hole 220 of second wing clamp 202. Accordingly, with fastener 170A loose, seat 12 can freely slide longitudinally relative to seat clamp 24D but when fastener 170A is tightened, mounting rods 20A and B are clamped between wing clamps 30D and 32D and side clamps 200 and 202, respectively, so as to rigidly fix seat clamp 24D to seat 12.

In one embodiment of the present invention, means are provided for releasably securing bicycle seat 12 to a first wing clamp and a second wing clamp independent of movement of the primary fastener. Examples of such means include saddle clamp 34 and side clamps 200, 202 discussed herein along with the related fasteners discussed herein. As also discussed herein fasteners other than bolts can be used with clamps 34, 200, and 202. Other configurations of clamps and related fasteners can also be used. Clamps 34, 200, and 202 disclosed herein are also examples of seat rod clamps. Other seat rod clamps can also be used.

In each of the different embodiments of the present invention, it is appreciated that the guide rails on the side of the guide body of the seat clamp and the retention rails on the side of the wing clamps can be reversed. For example, with regard to seat clamp 24 in FIG. 3, guide rails 50 and 52 can be mounted on the side of wing clamps 30 and 32 and retention rails 96, 98, and 100 can be mounted on the opposing sides of guide body 35 and still achieve the same function. In this configuration, however, the retention rails 96, 98, and 100 would then be referred to as guide rails and the guide rails 50 and 52 when then be referred to as retention rails. That is, to ensure that the appended claims properly read on alternative embodiments of the present invention, the rails on the side of the guide body, independent of the configuration, are referred to as the guide rails and the rails on the wing clamps, independent of the configuration, are referred to as the retention rails.

Furthermore, in all of the above discussed embodiments the guide rails and the retention rails curve upwardly in a complementary fashion. As an alternative to each of the above discussed embodiments, the guide rails and the retention rails can be inverted so as to curve downwardly in a complementary fashion.

The present invention may be embodied in other specific forms without departing from its spirit or essential characteristics. For example, the present application has disclosed a number of different embodiments of seat clamps. It is appreciated that different features of the different embodiments can be mixed and matched to form other embodiments and that other modified designs can also be used. Also, it should be appreciated that non conventional seat attachment mounting structures could be used such as the "I beam" system. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seat clamp assembly for securing a bicycle seat to a bicycle frame, the seat clamp assembly comprising:
    a body having a top surface and an opposing bottom surface with opposing first and second side faces extending therebetween, an arched first lower guide rail outwardly projects from and extends along the first side face while an arched second lower guide rail outwardly projects from and extends along the second side face;
    a first wing clamp positioned on the first lower guide rail;
    a second wing clamp positioned on the second lower guide rail;
    a primary fastener attaching the first wing clamp and the second wing clamp to the body, the primary fastener being movable between a first position wherein the first wing clamp and the second wing clamp are rigidly fixed to the body and a second position wherein the first wing clamp and the second wing clamp can freely slide along the first lower guide rail and the second lower guide rail, respectively; and
    means for releasably securing a bicycle seat to the first wing clamp and the second wing clamp independent of movement of the primary fastener.

2. The seat clamp assembly as recited in claim 1, wherein the means for releasably securing the bicycle seat comprises:
    a saddle clamp extending between the first wing clamp and the second wing clamp;
    a first secondary fastener securing the saddle clamp to the first wing clamp; and
    a second secondary fastener securing the saddle clamp to the second wing clamp.

3. The seat clamp assembly as recited in claim 2, wherein the saddle clamp is configured to secure the bicycle seat to the first wing clamp and the second wing clamp, the first and second secondary fasteners each being movable between a first position and a second position, when in the first position, the bicycle seat is rigidly fixed to the first wing clamp and the second wing clamp, when in the second position, the bicycle seat is freely slidable relative to the first wing clamp and the second wing clamp.

4. The seat clamp assembly as recited in claim 1, wherein the body further comprises:
    an arched first upper guide rail outwardly projecting from and extending along the first side face of the body;
    an arched second upper guide rail outwardly projecting from and extending along the second side face of the body; and
    an elongated arched slot extending between the first side face and the second side face of the body at a location between the upper guide rails and the lower guide rails, the primary fastener passing through the arched slot.

5. The seat clamp assembly as recited in claim 4, wherein the first wing clamp has an inside face with an arched first upper retention channel formed thereon and an arched first lower retention channel formed thereon, the first upper guide rail being received within the first upper retention channel and the first lower guide rail being received within the first lower retention channel.

6. The seat clamp assembly as recited in claim 4, wherein the first upper guide rail and the first lower guide rail are tapered.

7. The seat clamp assembly as recited in claim 1, wherein the primary fastener comprise a bolt that passes through the first wing clamp and threadedly engages that second wing clamp.

8. The seat clamp assembly as recited in claim 1, further comprising:
    the first wing clamp having an inside face with an arched first lower retention channel formed thereon and a first bridge outwardly projecting therefrom, the first lower guide rail of the body being received within the first lower retention channel; and
    the second wing clamp having an inside face with an arched second lower retention channel formed thereon and a second bridge outwardly projecting therefrom, the second lower guide rail of the body being received within the second lower retention channel so that when the primary fastener is in the first position, the second bridge biases against the first bridge.

9. The seat clamp assembly as recited in claim 8, wherein the means for releasably securing the bicycle seat comprising:
    a first side clamp disposed over an outside face of the first wing clamp;
    a second side clamp disposed over an outside face of the second wing clamp; and
    a secondary fastener that passes through the first wing clamp and the second wing clamp and secures the first side clamp and the second side clamp to the first wing clamp and the second wing clamp, respectively.

10. The seat clamp assembly as recited in claim 9, wherein the first bridge and the second bridge are tubular and bound a passageway extending therethrough, the secondary fastener passing through the first bridge and the second bridge.

11. The seat clamp assembly as recited in claim 1, further comprising an elongated post projecting from the base, the post having a central longitudinal axis extending therethrough, wherein for an imaginary plane that bisects the first lower guide rail and the second lower guide rail, the bisected halves of each guide rail are symmetrical about the plane, the imaginary plane being parallel to and offset from the central longitudinal axis of the post.

12. A seat clamp assembly for securing a bicycle seat to a bicycle frame, the seat clamp assembly comprising:
- a body having a top surface and an opposing bottom surface with opposing first and second side faces extending therebetween, an arched first lower guide rail outwardly projects from and extends along the first side face while an arched second lower guide rail outwardly projects from and extends along the second side face;
- a first wing clamp positioned on the first lower guide rail;
- a second wing clamp positioned on the second lower guide rail;
- a primary fastener attaching the first wing clamp and the second wing clamp to the body, the primary fastener being movable between a first position wherein the first wing clamp and the second wing clamp are rigidly fixed to the body and a second position wherein the first wing clamp and the second wing clamp can freely slide along the first lower guide rail and the second lower guide rail, respectively;
- a seat rod clamp; and
- a first secondary fastener releasably securing the seat rod clamp to the first wing clamp.

13. The seat clamp assembly as recited in claim 12, wherein the seat rod clamp comprises a saddle clamp extending between the first wing clamp and the second wing clamp and the first secondary fastener releasably secures the saddle clamp to the first wing clamp, further comprising a second secondary fastener releasably securing the saddle clamp to the second wing clamp.

14. The seat clamp assembly as recited in claim 12, wherein the seat rod clamp comprises:
- a first side clamp disposed over an outside face of the first wing clamp; and
- the first secondary fastener securing the first side clamp to the first wing clamp.

15. The seat clamp assembly as recited in claim 14, further comprises:
- a second side clamp disposed over an outside face of the second wing clamp; and
- the first secondary fastener passing through the first wing clamp and the second wing clamp and securing the first side clamp and the second side clamp to the first wing clamp and the second wing clamp, respectively.

16. The seat clamp assembly as recited in claim 12, wherein the a first wing clamp and the second wing clamp are configured so that they can each be disposed on either of the first lower guide rail or the second lower guide rail, and can each freely slide along the first lower guide rail or the second lower guide rail on which they are disposed when the fastener is in the second position.

17. A seat clamp assembly for securing a bicycle seat to a bicycle frame, the seat clamp assembly comprising:
- a body having a top surface and an opposing bottom surface with opposing first and second side faces extending therebetween, an arched first lower guide rail outwardly projects from and extends along the first side face while an arched second lower guide rail outwardly projects from and extends along the second side face;
- an elongated post secured to the body, the post having a central longitudinal axis extending therethrough;
- a first wing clamp positioned on one of the first lower guide rail or second lower guide rail;
- a second wing clamp disposed on the other of the first lower guide rail or second lower guide rail;
- a primary fastener attaches the first wing clamp and the second wing clamp to the body, the primary fastener being movable between a first position wherein the first wing clamp and the second wing clamp are rigidly fixed to the body and a second position wherein the first wing clamp and the second wing clamp can freely slide along the first lower guide rail and the second lower guide rail, respectively;
- wherein the first wing clamp and the second wing clamp can each be disposed on either of the first lower guide rail or second lower guide rail and can each freely slide along the first lower guide rail or the second lower guide rail on which they are disposed when the fastener is in the second position;
- a first side clamp disposed over an outside face of the first wing clamp and having an elongated rod channel formed thereon, the rod channel having a central longitudinal axis extending along the length thereof, an imaginary plane bisects the rod channel while being disposed orthogonal to the central longitudinal axis of the rod channel;
- wherein when the first wing clamp is positioned on the first lower guide rail and the imaginary plane is parallel to the central longitudinal axis of the post, a first offset is formed between the plane and the central longitudinal axis of the post; and
- wherein when the first wing clamp is positioned on the second lower guide rail and the imaginary plane is parallel to the central longitudinal axis of the post, a second offset is formed between the plane and the central longitudinal axis of the post, the second offset being different than the first offset.

18. The seat clamp assembly as recited in claim 17, further comprising:
- the first wing clamp having an elongated rod channel formed thereon, the rod channel having a central longitudinal axis extending along the length thereof, an imaginary plane bisects the rod channel while being disposed orthogonal to the central longitudinal axis of the rod channel;
- wherein when the first wing clamp is positioned on the first lower guide rail and the imaginary plane is parallel to the central longitudinal axis of the post, a first offset is formed between the plane and the central longitudinal axis of the post; and
- wherein when the first wing clamp is positioned on the second lower guide rail and the imaginary plane is parallel to the central longitudinal axis of the post, a second offset is formed between the plane and the central longitudinal axis of the post, the second offset being different than the first offset.

19. The seat clamp assembly as recited in claim 17, further comprising:
- a seat rod clamp; and
- a first secondary fastener that releasably secures the seat rod clamp to the first wing clamp.

20. The seat clamp assembly as recited in claim 17, further comprising an elongated post projecting from the base, the post having a central longitudinal axis extending therethrough, wherein for an imaginary plane that bisects the first lower guide rail and the second lower guide rail, the bisected halves of each guide rail are symmetrical about the plane, the imaginary plane being parallel to and offset from the central longitudinal axis of the post.

21. A seat clamp assembly for securing a bicycle seat to a bicycle frame, the seat clamp assembly comprising:
- a body having a top surface and an opposing bottom surface with opposing first and second side faces extending therebetween, an arched first lower guide rail outwardly projects from and extends along the first side face while an arched second lower guide rail outwardly projects from and extends along the second side face;
- an elongated post secured to the body, the post having a central longitudinal axis extending therethrough;
- a first wing clamp positioned on one of the first lower guide rail or second lower guide rail;
- a second wing clamp disposed on the other of the first lower guide rail or second lower guide rail;
- a primary fastener attaches the first wing clamp and the second wing clamp to the body, the primary fastener being movable between a first position wherein the first wing clamp and the second wing clamp are rigidly fixed to the body and a second position wherein the first wing clamp and the second wing clamp can freely slide along the first lower guide rail and the second lower guide rail, respectively;
- a seat rod clamp; and
- a first secondary fastener that releasably secures the seat rod clamp to the first wing clamp;
- wherein the first wing clamp and the second wing clamp can each be disposed on either of the first lower guide rail or second lower guide rail and can each freely slide along the first lower guide rail or the second lower guide rail on which they are disposed when the fastener is in the second position.

22. A seat clamp assembly for securing a bicycle seat to a bicycle frame, the seat clamp assembly comprising:
- a body having a top surface and an opposing bottom surface with opposing first and second side faces extending therebetween, an arched first lower guide rail outwardly projects from and extends along the first side face while an arched second lower guide rail outwardly projects from and extends along the second side face;
- an elongated post secured to the body, the post having a central longitudinal axis extending therethrough;
- a first wing clamp positioned on one of the first lower guide rail or second lower guide rail;
- a second wing clamp disposed on the other of the first lower guide rail or second lower guide rail;
- a primary fastener attaches the first wing clamp and the second wing clamp to the body, the primary fastener being movable between a first position wherein the first wing clamp and the second wing clamp are rigidly fixed to the body and a second position wherein the first wing clamp and the second wing clamp can freely slide along the first lower guide rail and the second lower guide rail, respectively;
- wherein the first wing clamp and the second wing clamp can each be disposed on either of the first lower guide rail or second lower guide rail and can each freely slide along the first lower guide rail or the second lower guide rail on which they are disposed when the fastener is in the second position;
- the first wing clamp having an elongated rod channel formed thereon, the rod channel having a central longitudinal axis extending along the length thereof, an imaginary plane bisects the rod channel while being disposed orthogonal to the central longitudinal axis of the rod channel;
- wherein when the first wing clamp is positioned on the first lower guide rail and the imaginary plane is parallel to the central longitudinal axis of the post, a first offset is formed between the plane and the central longitudinal axis of the post; and
- wherein when the first wing clamp is positioned on the second lower guide rail and the imaginary plane is parallel to the central longitudinal axis of the post, a second offset is formed between the plane and the central longitudinal axis of the post, the second offset being different than the first offset.

23. The seat clamp assembly as recited in claim 1, wherein the means for releasably securing the bicycle seat comprises:
- a clamp; and
- a first secondary fastener securing the clamp to the first wing clamp or the second wing clamp.

* * * * *